(12) United States Patent
Theobald

(10) Patent No.: US 9,413,954 B1
(45) Date of Patent: Aug. 9, 2016

(54) SYSTEM FOR PROVIDING CAMERA VIEWS

(71) Applicant: Daniel Theobald, Somerville, MA (US)

(72) Inventor: Daniel Theobald, Somerville, MA (US)

(*) Notice: Subject to any disclaimer, the term of this patent is extended or adjusted under 35 U.S.C. 154(b) by 394 days.

(21) Appl. No.: 13/868,085

(22) Filed: Apr. 22, 2013

Related U.S. Application Data

(63) Continuation of application No. 12/626,990, filed on Nov. 30, 2009, now Pat. No. 8,446,457.

(51) Int. Cl.
*H04N 7/00* (2011.01)
*H04N 5/232* (2006.01)
*H04N 7/18* (2006.01)
*H04N 5/225* (2006.01)
*H04N 5/247* (2006.01)

(52) U.S. Cl.
CPC ......... *H04N 5/23238* (2013.01); *H04N 5/2251* (2013.01); *H04N 5/247* (2013.01); *H04N 7/181* (2013.01)

(58) Field of Classification Search
CPC . H04N 7/181; H04N 5/23238; H04N 5/2251; H04N 5/247
See application file for complete search history.

(56) References Cited

U.S. PATENT DOCUMENTS

| | | | | |
|---|---|---|---|---|
| 6,879,338 B1* | 4/2005 | Hashimoto | ........ | H04N 5/23238 348/36 |
| 7,733,416 B2* | 6/2010 | Gal | .................. | G08B 13/19619 348/158 |
| 2004/0061787 A1* | 4/2004 | Liu | ........................ | H04N 5/232 348/218.1 |
| 2007/0292629 A1* | 12/2007 | Linnenkohl | ............ | G01N 21/88 427/466 |

* cited by examiner

*Primary Examiner* — Larry Donaghue
(74) *Attorney, Agent, or Firm* — Albert J. Brunett

(57) ABSTRACT

A camera system having at least one self-contained, universally mountable camera module having a housing and a plurality of cameras disposed within the confines of the housing, each camera having a predetermined field of view to the exterior of the housing that when combined provide at least a 180 degree view about the housing. The system also includes communication elements within the housing to provide electrical communication between the plurality of cameras and a position external to the module and at least one receiver that receives the camera views from the module that is operable by a user to view one or more camera views at a time as individual views as well as a composite view of at least two or more camera views.

6 Claims, 5 Drawing Sheets

SYSTEM FOR PROVIDING CAMERA VIEWS

CROSS-REFERENCE TO RELATED APPLICATIONS

This application is a continuation of and claims the benefit of priority under 35 U.S.C. §120 to U.S. patent application Ser. No. 12/626,990, entitled "SYSTEM FOR PROVIDING CAMERA VIEWS," filed on Nov. 30, 2009, which is hereby incorporated by reference herein in its entirety.

This application is related to U.S Patent Application entitled "Miniature Camera Module" and U.S. Patent Application entitled "Method of Providing Camera Views about an Object or Area", both of which are assigned to the same assignee as the assignee herein, filed concurrently herewith and herby incorporated by reference.

BACKGROUND OF THE INVENTION

The present invention relates generally to systems for providing camera views and more particularly to camera systems having camera modules that provide camera views to locations remote from the modules.

SUMMARY OF THE INVENTION

A camera system having at least one self-contained, universally mountable camera module having a housing and a plurality of cameras disposed within the confines of the housing, each camera having a predetermined field of view to the exterior of the housing that when combined provide at least a 180 degree view about the housing. The system also includes communication elements within the housing to provide electrical communication between the plurality of cameras and a position external to the module and at least one receiver that receives the camera views from the module that is operable by a user to view one or more camera views at a time as individual views as well as a composite view of at least two or more camera views.

DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

DESCRIPTION OF THE PREFERRED EMBODIMENTS

The present invention will be described in detail with reference to embodiments that represent examples of the present invention and are not intended to limit the scope of the invention. Although specific elements and configurations are described to provide an understanding of the invention, it is to be understood that the specific embodiments, elements and configurations provided are for illustrative purposes only. Other configurations will be recognized by those of ordinary skill in the art without departing from the teachings of the present invention or the scope of the appended claims.

Figure 1:
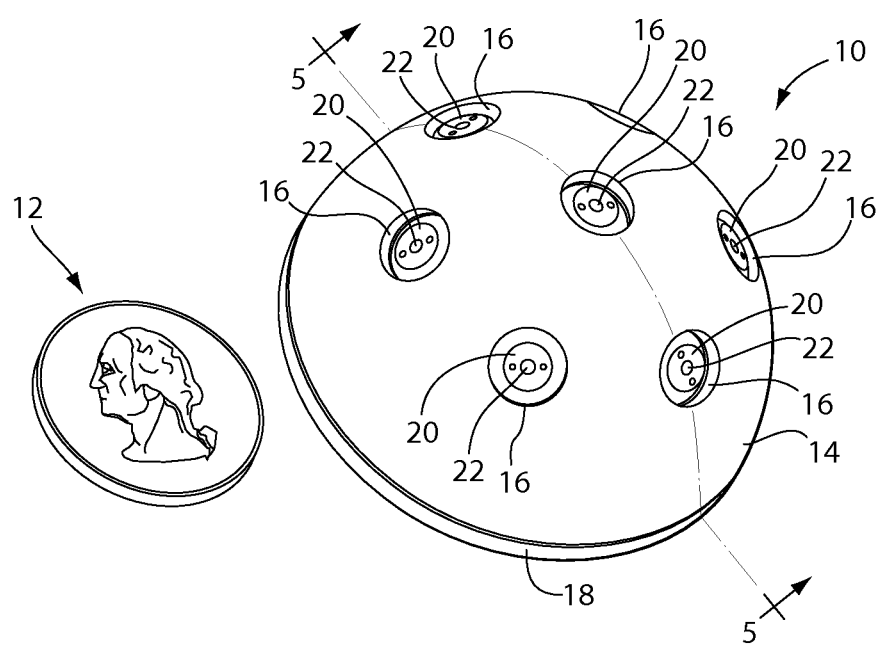
FIG. 1. is a perspective view illustrating one embodiment of a camera module that may be utilized in the present invention.

Referring to FIG. 1, one embodiment of the camera module of the present invention is generally illustrated by reference numeral 10. The module 10 is illustrated having a generally hemispherical shape, although the size and shape may vary, and may be a miniature module or the like as is illustrated in FIG. 1 with respect to a United States quarter dollar 12.

Although not illustrated, the module 10 may also be in the form of a hemispheroid, either oblate (earth shaped) or prolate (rugby football shaped), or in the form of a plurality of substantially flat or oblique surfaces joined together to form similar types of shapes. Although the module 10 preferably is formed as an oblique object, it is to be understood that the module 10 can have a variety of shapes and sizes without departing from the teachings of the present invention or the appended claims.

The unique shape and size of the module 10 itself enables a number of novel features to be realized by the present invention. These features, among others, include overlapping fields of view for multiple redundancy, a direct camera view for virtually every direction, unobtrusive and inconspicuous operation to resist or eliminate being blocked, detected and/or disabled, and substantially oblique surfaces that, combined with the material of the module 10, can resist disablement from a foreign object or the like as will be described in more detail herein.

Figure 2:
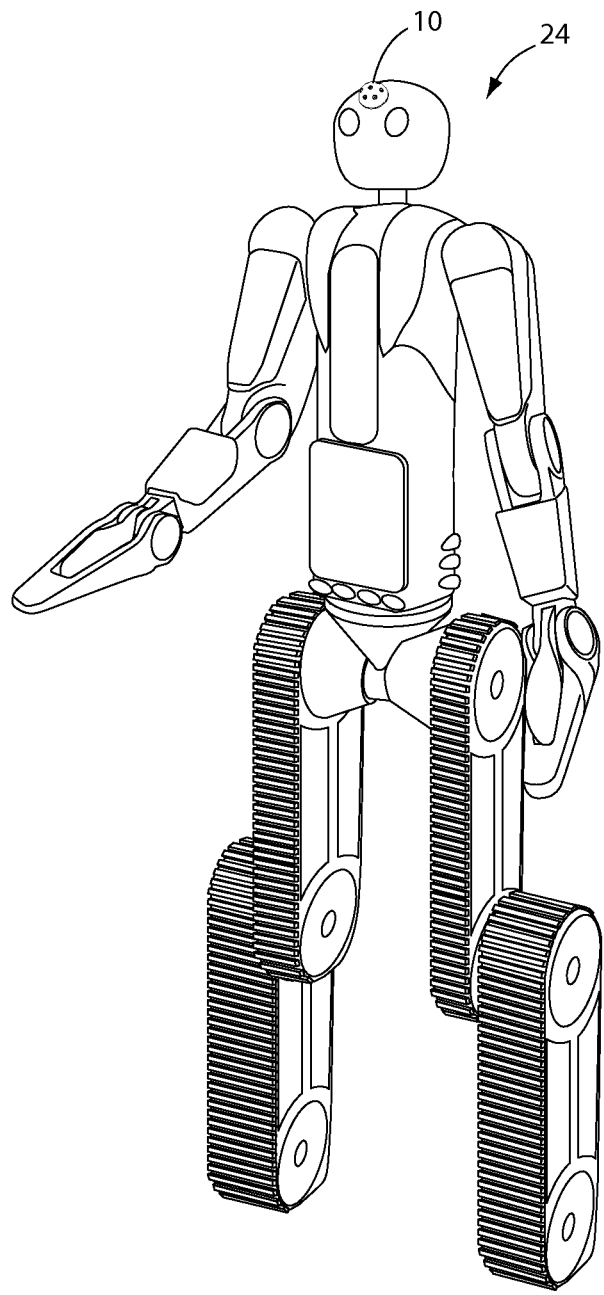
FIG. 2. is a front plan view illustrating the camera module of FIG. 1 attached to an unmanned vehicle, such as a robot.
Figure 3:
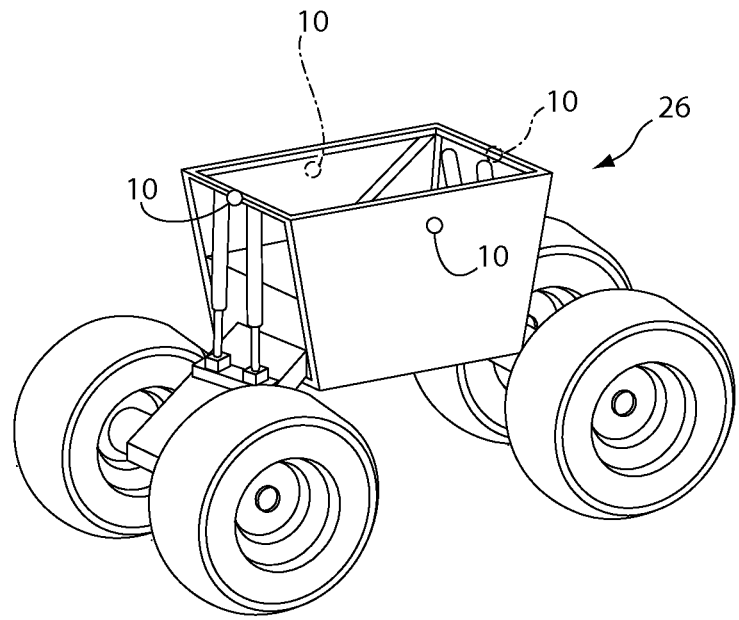
FIG. 3. is a perspective view illustrating one or more of the camera modules of FIG. 1 attached to another type of unmanned vehicle.
Figure 4:
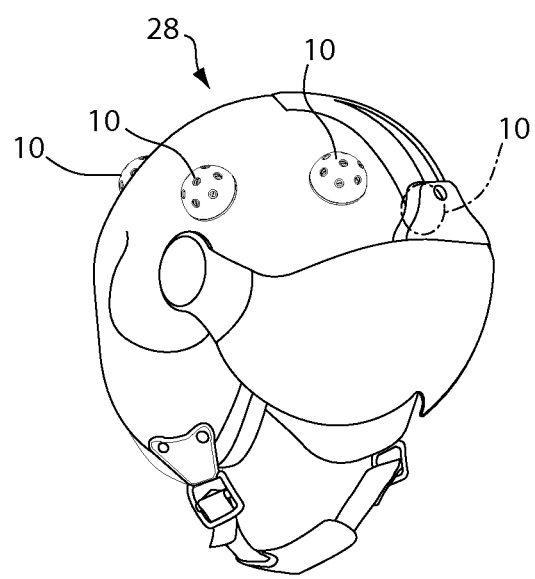
FIG. 4 is a is a perspective view of a head mounted display illustrating multiple camera modules of FIG. 1 secured thereto.

The module 10 substantially includes a hemispherical housing 14 having a plurality of apertures 16 therethrough and a substantially flat surface 18 for mounting of the module 10 against a desired article (generally illustrated in FIGS. 2-4). The module 10 also includes a plurality of cameras 20, each camera 20 being preferably secured within the confines of the housing 14 so that a lens 22 of each camera 20 provides a desired field of view through a respective aperture 16. Although the module 10 is illustrated with seven cameras 20, the number of cameras 20 and their position with respect to the housing 14, the fields of view and the lenses provided, among other features, may vary.

The housing 14 is designed as a substantially hollow, hemispherical member with a desired thickness and can be formed from any desired material such as plastic or metal (including steel or titanium, for example) or the like as well as a variety of composite materials, including any type of bullet resistant or bullet proof materials such as Kevlar, Lexan or the like so long as the module 10 functions as desired. The housing 14 may also be used in outdoor environments by making it water resistant or waterproof by making it completely sealed against the environment and may be protected by any type of desired armor. It is to be understood, however, that the material of the housing 14, or any other elements or features of the housing 14, may vary without departing from the teachings of the present invention or the appended claims.

If desired, the module 10 may be designed to be completely self-contained with all electronics included inside the housing 14 such as microprocessor(s), data storage, power and external communications such as by any wireless method including Bluetooth, for example. With such a design, all processing of the videos from the various cameras 20 can be accomplished by the module 10 itself, including stitching together all the various views of the cameras 20 into one data stream to be stored within, or transmitted to the exterior of, the module 10.

Although the flat surface 18 of the housing 14 is not illustrated in detail, the flat surface 18 may allow for access to the interior of the housing 14 for mounting or replacement of the cameras 20 therein such as by the use of an openable or removable plate, door or the like or any other type of access. The housing 14 may also include a mounting structure or element (not illustrated) either as part of the flat surface 18 or any other part of the housing 14 including, but not limited to, such mounting methods as screws, brackets, clips, adhesives, and hook-and-loop fasteners, for example.

The apertures 16 of the housing 14 may be through-apertures having the same diameter through the housing 14, may be tapered or take on any other desired size, shape or configuration. Alternatively, the apertures 16 may be replaced with pockets (not illustrated) formed in the housing 14 to accept the cameras 20 therein.

FIG. 2 illustrates one embodiment of the module 10 mounted to an unmanned vehicle such as a robot 24 or the like where the module 10 and cameras 20 can be used in a "visual odometry" type of application where the position, operation and/or orientation of the robot 24 is determined by analyzing images from one or more cameras 20. If desired, multiple modules 10 (not illustrated) may also be used with the robot 24 to provide multiple views from a variety of positions about the robot 24.

As FIG. 3 illustrates, one or more modules 10 may also be mounted to an unmanned transport vehicle 26 intended for transporting items or the like. When the transport vehicle 26 is in the form of a substantially rectangular object as illustrated, the views of the modules 10 enable multiple overlap between modules 10 as described below with regard to FIG. 5.

As FIG. 4 illustrates, one or more modules 10 may also be used in conjunction with a head mounted display 28 illustrated in the form of a helmet. It is to be understood, however, that the number and position of modules 10 utilized at any time can vary and the module 10 may be utilized in a variety of applications other than those illustrated.

The use of a module 10 along with multiple cameras 20 and/or multiple modules 10 and the design and shape of the modules 10 themselves represents a dramatic shift away from current remote camera design and application. For example, by providing multiple cameras 20 in a module 10 arranged according to the teachings of the present invention a new level of redundancy in camera views is achieved in the event of a malfunction of one or more of the cameras 20 as will be described further below. Intentional or unintentional disablement of the module 10 can also be more difficult since, due to the overlapping views, each camera 20 in each module 10 must be disabled to prevent a desired view and access to each camera 20 or module 10 may be difficult or too time consuming, for example.

By using multiple modules 10, an additional level of redundancy in camera views can be provided according to the teachings of the present invention by providing multiple sets of cameras 20 in multiple, separate locations selected to provide a heightened level of view redundancy or overlap. This not only can be beneficial in the event of the malfunction or disablement of one or more cameras 20, but in the malfunction or disablement of one or more modules 10.

Figure 5:
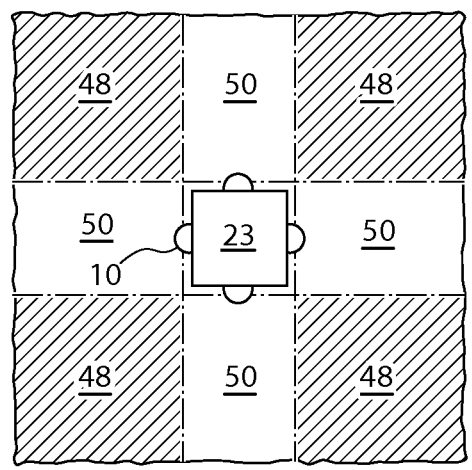
FIG. 5 is a partial cross-sectional view of the camera module of the present invention substantially taken along lines 5-5 of FIG. 1.

With reference to FIG. 5, when multiple modules 10 are used on a rectangular object such as the transport vehicle 26 significant portions about the transport vehicle 26 are covered by two modules 10. In this embodiment, coverage by two modules 10 is illustrated by the four single lined sections 48 while coverage by just one module 10 is illustrated by the four unlined sections 50. Of course, for each module 10 seven cameras 20 provide the desired hemispherical view with overlapping fields of view as described above.

With multiple modules 10, intentional or unintentional disablement of one or more modules 10 is more difficult or unlikely. This is particularly important when the modules 10 are used in a security surveillance setting or in conjunction with a robot or other type of unmanned vehicle or craft and even more so in a combat environment. Specifically, when used in a robot or the like, when the camera viewing system is inoperable or disabled the robot is unable to function and if remotely controlled the user is unable to continue to "see" where the robot is and/or needs to be moved.

When used in a hostile environment, such as a surveillance setting or combat zone, an entity who may be interested in disabling the robot can merely take measures to attempt to disable a the camera 20, such as with a projectile, cover, spray paint, implement or other member. With multiple modules 10, while an entity may disable one or more modules 10 the operator may still be able to utilize an existing module 10 not discovered or disabled by an entity to move the robot out of the area.

The design of the module 10 itself also adds to the ability of an operator to maintain control over a robot. The small size of the module 10 provides an extremely low profile making the module 10 unobtrusive and relatively inconspicuous compared to existing modules. If desired, the module 10 can also be camouflaged to blend in with a particular background as illustrated in FIG. 1 to make it even more difficult to spot and potentially disable.

The hemispherical, hemispheroid or other oblique design of the module 10 aids in preventing disabling the module 10 by providing oblique surfaces that may deflect a projectile or implement. This shape also makes breaking off of the module 10 from a surface it is attached to more difficult, particularly if some type of security resistant mounting is employed. When the oblique surfaces of the module 10 are combined with the module 10 being formed from a strong material, such as metal or a bullet resistant or bullet proof material or the like, disabling of the module 10 from a projectile or implement is less likely.

As readily can be understood from FIG. 1, due to the positioning of the cameras 20 about the module 10, when the video of each camera 20 is combined a hemispherical, panoramic or "panospheric" view (hereinafter "view" or "hemispherical view") about the module 10 is provided. The view may extend up to at least 180 degrees in any direction about the periphery of the module 10 but may vary depending on the types of cameras 20 and lenses 22 utilized and the positions about the housing 14.

When multiple modules 10 are used, such as shown with the head mounted display 28 of FIG. 4, for example, the view about the periphery of the display 28 extends well beyond 180 degrees. Although four modules 10 are illustrated, any number of modules 10 can be positioned on the robot 24 or transport vehicle 26 so that a full 360 degree view is provided about the robot 24 or transport vehicle 26.

The cameras 20 can be any type of camera, video or still, so long as they function as desired, including, but not limited to cameras having a micro lens, miniature and subminiature cameras, fiber optic cameras, CCD cameras, active pixel or CMOS image sensors, or the like including future camera types and styles. Additionally, various software required to "stitch" the various views together is readily available or can be independently developed to fit the particular application.

Preferably, the cameras 20 are not high level resolution cameras, rather, lower resolution cameras 20 are utilized the resolution of which depends on the particular application. In many applications, the quality of the image being captured is not necessarily an important criteria, rather, capturing a desired image with an acceptable level of quality is all that is necessary.

The use of a plurality of lower resolution cameras 20 represents an important shift in the art that enables the desired views in a more economical package to enable applications that previously were cost prohibitive. The cost of modules 10 with lower resolution cameras 20 can be low enough to enable modules 10 to be disposable if desired.

A variety of electronics and power supply (not illustrated) may be used along with the cameras 20 to provide the desired view. The electronics and power supply may be contained within the confines of the housing 14 or outside the housing 14 such as within a portion of the robot 24, transport vehicle 26, or head mounted display 28 or in a separate unit utilized in conjunction with the robot 24, transport vehicle 26 or head mounted display 28. The electronics may be hard wired to the cameras 20 and other peripheral devices or be connected wirelessly, if desired.

The module 10 preferably is designed as a self-contained readily replaceable unit to assist in initial mounting and subsequent repair by merely replacing the module 10. In this respect, the module 10 can be used substantially as an interchangeable platform for use with multiple vehicles or other objects as is more frequently being requested in military or other operations to reduce costs incurred from the use of multiple platforms.

Additionally, a minimal amount of electronics may be included with the cameras 20 or within the housing 20 for wireless communication with a variety of external peripheral devices. Such devices may include, for example, remote displays, microprocessor controlled devices, various user input/output devices or the like. External viewing can be a composite view of all of the cameras 20, the view of any individual camera 20 or any combination of two or more video cameras 20 if desired.

In one preferred embodiment, the view provided by the cameras 20 may be fed to an operator or other individual or individuals at a location proximate to or remote from the module(s) 10. This view can, for example, be used to manipulate the robot 24 or transport vehicle 26 about various terrain and environments or to accomplish various tasks. It is to be understood that to manipulate the robot 24 or transport vehicle 26 discrete electronic and power systems separate from the electronics of the module 10 may be employed.

Additionally, the head mounted display 28 of FIG. 4 may be used by a wearer to provide a full view about the viewer to both the viewer as well as one or more individuals at remote locations. Although the head mounted display 28 is illustrated with four modules 10 positioned on the front, rear and two sides respectively, it is to be understood that the number and position of the modules 10 can vary.

One of the many important features of the module 10 is the ability to simultaneously capture and display all data with regard to all views of each camera 20 in real time or substantially real time. This enables viewers at remote locations to choose one or more cameras 20 to select the view or composite view they are interested in viewing regardless of the direction the wearer is facing. This may enable the remote viewers to draw the attention of the wearer to another direction that may be of interest to them or to watch one or more directions for the safety of the wearer, such as in a military, police or similar applications.

Additionally, since various camera views from multiple cameras 20 are simultaneously captured or "pre-loaded", delays in changing views with the head mounted display 28 upon turning of the wearer's head or turning of the robot 24 or transport vehicle 26 is reduced or eliminated. When using a single camera rather than multiple cameras 20 as in the present invention there will be a lag or delay in views when the camera is moved which is undesirable and perhaps dangerous in certain applications.

Similarly, when multiple modules 10 are utilized providing various views from multiple cameras 20 from each module 10, the various camera views from multiple cameras 20 are simultaneously captured or "pre-loaded" to eliminate delays in views. This is an important feature for not only the head mounted display 28 but also the robot 24 and transport vehicle 26.

For example, with a head mounted display 28 if only one module 10 is used the views provided by the multiple cameras 20 is more of a panoramic or "panospheric" view that extends in a hemispherical direction substantially in the direction the module is facing. As the wearer turns his/her head say to the left, the view that previously was on the left periphery of the wearer now becomes the front view with respect to the wearer. At the same time, a new left periphery view is provided to the wearer or remote viewer.

When using multiple modules 10, the wearer is always provided with a clear view of the direction he/she is facing. It also enables a wearer to more quickly move his/her head back and forth without losing the view of the direction he/she is facing.

Another important feature of the module 10 is the ability to enable more placement positions with respect to an object, such as the robot 24 or transport vehicle 26. This is not only due to the substantially small size of the module 10 but due to the use of multiple modules 10 that break up the 360 degree view into several hemispherical views that may overlap each other to provide redundant or overlapping views. Typically, in existing applications if single or multiple cameras are provided in a central location (not illustrated) for fixed position or rotation to provide a wide view up to 360 degrees, that view readily can be blocked during operation of the robot 24 or transport vehicle 26 by components of the robot 24 or transport vehicle 26.

The relatively small sizes capable of the module 10 enable more placement positions on an object to provide increased number of views or placement where a camera system typically may not fit. Additionally, due to the small size of the module 10 it can be placed closer to an object or surface to reduce the size of any potential blind spot that may occur near the object or surface itself.

When multiple modules 10 are used with a robot 24 or other unmanned transport vehicle 26 since the robot 24 or vehicle 26 can typically move in multiple directions, when one module 10 is broken or disabled the robot 24 or vehicle 26 can still function. In this situation, an operator can merely switch views to another module or modules 10 and merely direct the robot 24 or vehicle 26 to move in another direction while the operator can still manipulate the robot 24 or vehicle 26 as desired.

Figure 6:
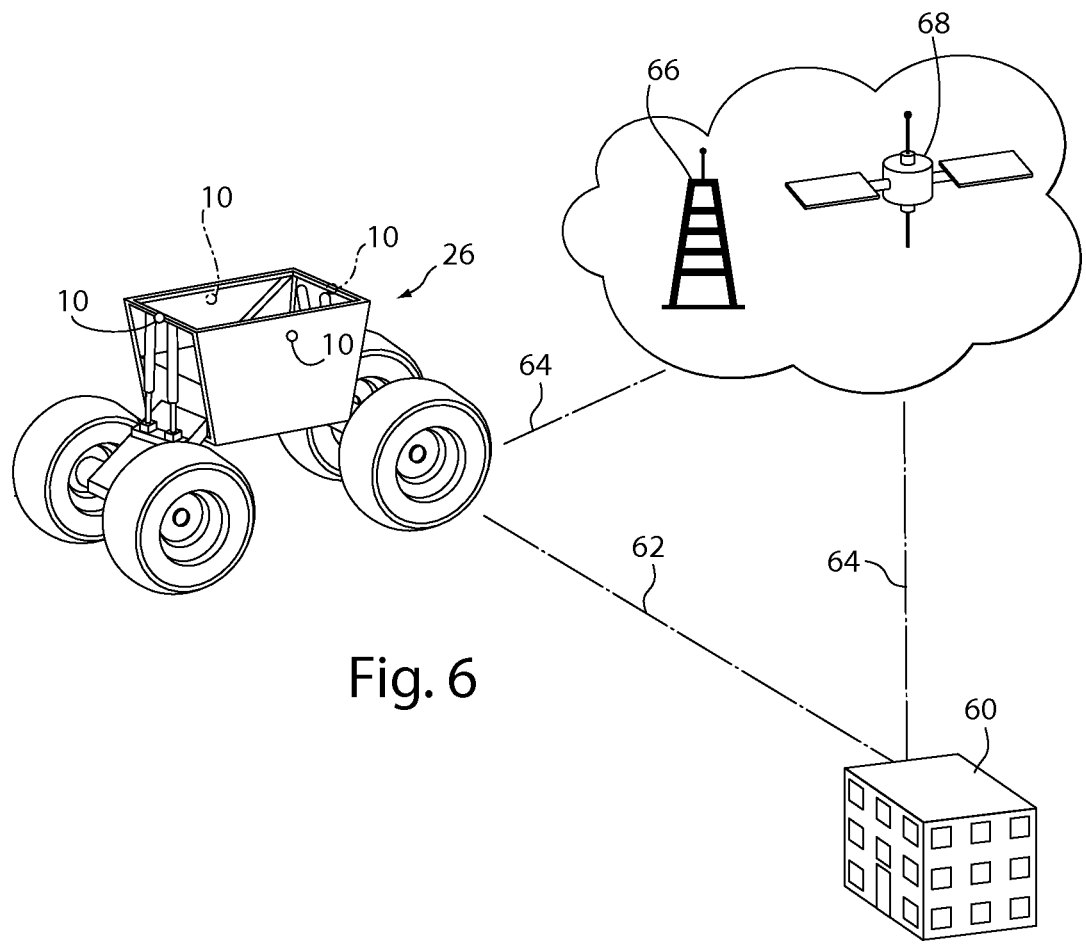
FIG. 6 is a diagram of one embodiment of the system of the present invention.

Another embodiment of the invention of the present disclosure is illustrated in FIG. 6 where a system is generally illustrated implementing the modules 10 of the present invention. Typically, the modules 10, shown here with the transport vehicle 26, transmit one or more composite video signals or a plurality of video signals, one each for each camera view, to a remote location generally illustrated by the reference numeral 60.

The remote location 60 can be any desired distance and the modules 10 can communicate directly with the location 60, as illustrated by dashed lines 62, or indirectly as illustrated by dashed lines 64 via ground based transmission systems 66 or even by one or more satellites 68. Although a wireless type of transmission system is illustrated in FIG. 6, it is to be noted that any type of transmission system, wired or wireless, can be employed without departing from the teachings of the present invention.

Figure 7:
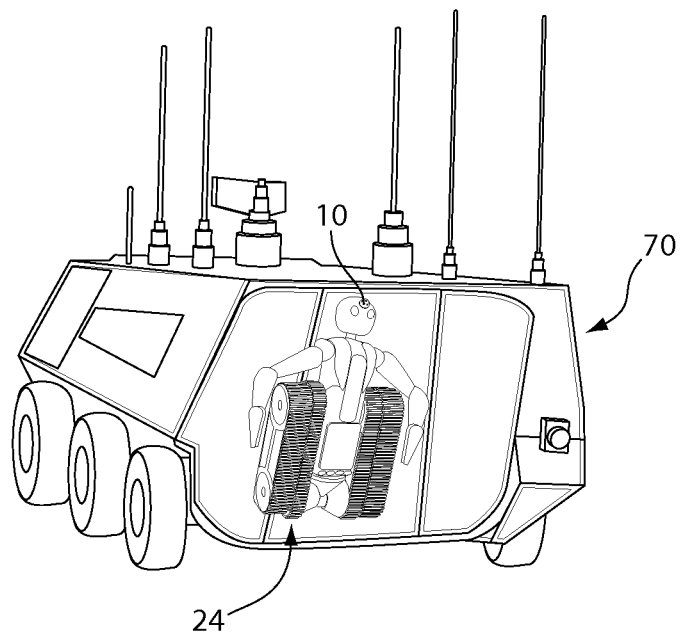
FIG. 7. is a perspective view illustrating the camera module of the present invention utilized with multiple vehicles.

FIG. 7 illustrates the modules 10 utilized along with a robot 24 in a military application. In this embodiment, the robot 24 is removeably secured to a military vehicle 70. It is to be understood, however, that the vehicle 70 as well as the robot 24 associated with the vehicle 70 can vary, and the vehicle 70 can be a manned or unmanned vehicle (such as a "drone") or an aerial vehicle such as a helicopter or airplane, for example, if desired.

In this type of application the vehicle 70 serves to transport the robot 24 from one area to another for deployment of the robot 24 where needed. This helps conserve the power on the robot 24, among other advantages.

The robot 24 may be connected to the vehicle 70 both mechanically and electronically to maintain the robot 24 attached to the vehicle 70 till needed along with providing communication signals from the robot 24 to a position on the vehicle 70 if desired. The communication signals can be forwarded directly by the robot 24 to a remote location 60 or from the vehicle 70 to a remote location 60, with or without amplification or other processing, or can be received on the vehicle 70 by an operator to control the robot 24.

While secured to the vehicle 70 if the robot 24 has any batteries or any other type of power source that needs recharging or refilling such recharging or refilling can be accomplished during that time. This will enable the robot 24 to be ready for deployment when the vehicle 70 reaches the area when the assistance of the robot 24 is needed.

It is to be noted that the robot 24 may attach and detach itself from the vehicle 70 without the need for any other type of human or machine to assist. For example, when the robot 24 generally illustrated in FIG. 2 is utilized the robot 24 is capable of being manipulated to disengage itself from the vehicle 70 by an operator or even autonomously if desired due to the unique design of the robot 24 and engagement mechanism with the vehicle 70. It is to be understood, however, that a variety of different types of robots or other devices other than the robot 24 can be utilized in this manner with the vehicle 70.

Figure 8:
FIG. 8 is a perspective view illustrating multiple camera modules of the present invention utilized with a head mounted display worn by a user.

FIG. 8 illustrates another use of the system of the present invention where the head mounted display 28 of FIG. 4 is shown attached to a user such as a soldier 72. This so called "soldier of the future" can be provided with 360 degree views about his position to dramatically increase his situational awareness as well as provide assistance to the solider 72 in a hostile environment by a user of the system remote from the solder 72 as described above. If desired, the cameras 20 may also be capable of low light or night vision, such as an infrared or other type of camera without departing from the teachings of the present invention.

The embodiments of the present disclosure may be implemented with any combination of hardware and software. If implemented as a computer-implemented apparatus, the embodiments of the present disclosure are implemented using means for performing all of the steps and functions described above.

The embodiments of the present disclosure can be included in an article of manufacture (e.g., one or more computer program products) having, for instance, computer useable media. The media has embodied therein, for example, computer readable program code means for providing and facilitating the mechanisms of the embodiments of the present disclosure. The article of manufacture can be included as part of a computer system or sold separately.

Although the description above contains many specific examples, these should not be construed as limiting the scope of the embodiments of the present disclosure but as merely providing illustrations of some of the presently preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

I claim:

1. A camera apparatus, comprising:
a receptacle configured with a peripheral wall and a plurality of apertures, the peripheral wall having a generally hemispherical exterior surface, each of the apertures extending through the peripheral wall to the generally hemispherical exterior surface, and the apertures including a central aperture and a plurality of peripheral apertures arranged in an annular array and disposed circumferentially around the central aperture;
a plurality of cameras secured with the receptacle, each of the cameras including a lens positioned to have a respective field of view to an exterior of the receptacle, the cameras including a central camera and a plurality of peripheral cameras, the lens of the central camera is arranged with the central aperture, and the lens of each of the peripheral cameras is arranged with a respective one of the peripheral apertures, wherein image data provided by the cameras is combinable to provide a panospheric field of view that includes at least a portion of the field of view associated with each of the cameras; and
a plurality of electrical communication elements within the receptacle, the electrical communication elements configured to provide direct signal communication between each of the cameras and another device exterior of the receptacle to at least enable redundancy between the various views provided by the cameras.

2. The camera apparatus of claim 1, wherein the receptacle has at least one planar surface opposite the generally hemispherical exterior surface for mounting of the apparatus against a surface of another device.

3. The camera apparatus of claim 1, further comprising a processing device configured to combine the image data provided by the cameras to provide one composite data stream that is to be transmitted to the other device exterior of the receptacle, wherein the processing device is within the receptacle.

4. The camera apparatus of claim 1, wherein the plurality of peripheral apertures comprise six peripheral apertures, and wherein the plurality of peripheral cameras comprise six peripheral cameras.

5. The camera apparatus of claim 1, wherein the peripheral cameras comprise a first pair of peripheral cameras and a second pair of peripheral cameras, the first pair of the peripheral cameras are aligned with the central camera along a first plane, the second pair of the peripheral cameras are aligned with the central camera along a second plane, and the first plane and the second plane are angularly offset from one another and coincident at the central camera.

6. The camera apparatus of claim 1, wherein the lens of each of the cameras is positioned within a respective one of the apertures and recessed from the generally hemispherical exterior surface.

\* \* \* \* \*